(12) United States Patent
Silny et al.

(10) Patent No.: US 9,042,694 B2
(45) Date of Patent: May 26, 2015

(54) ENERGY TARGET SYSTEM (75) Inventors: John F. Silny, Los Angeles, CA (US);
Jeffrey M. Guild, Torrance, CA (US)

(73) Assignee: Raytheon Company, Waltham, MA (US)

( * ) Notice: Subject to any disclaimer, the term of this patent is extended or adjusted under 35 U.S.C. 154(b) by 805 days.

(21) Appl. No.: 12/964,883

(22) Filed: Dec. 10, 2010

(65) Prior Publication Data
US 2012/0148188 A1    Jun. 14, 2012

(51) Int. Cl.
*G02B 6/04* (2006.01)
*G01J 1/42* (2006.01)
*G01J 1/04* (2006.01)
*G02B 6/06* (2006.01)

(52) U.S. Cl.
CPC ............ *G01J 1/4257* (2013.01); *G01J 1/0425* (2013.01); *G01J 1/4228* (2013.01); *G02B 6/06* (2013.01)

(58) Field of Classification Search
None
See application file for complete search history.

(56) References Cited

U.S. PATENT DOCUMENTS

| | | |
|---|---|---|
| 3,738,168 A | 6/1973 | Mansell |
| 4,321,824 A | 3/1982 | Martin |
| 4,769,700 A | 9/1988 | Pryor |
| 4,793,715 A | 12/1988 | Kasner et al. |
| 4,797,555 A | 1/1989 | La Mar |
| 4,871,250 A | 10/1989 | Koseki |
| 4,964,735 A | 10/1990 | Sasnett et al. |
| 5,141,330 A | 8/1992 | Gregory et al. |
| 6,314,631 B1 | 11/2001 | Pryor |
| 2001/0055462 A1* | 12/2001 | Seibel ........................ 385/147 |
| 2006/0273260 A1* | 12/2006 | Casstevens et al. ........ 250/458.1 |
| 2009/0003764 A1* | 1/2009 | Ridder et al. .................. 385/14 |

* cited by examiner

*Primary Examiner* — Uyen Chau N Le
*Assistant Examiner* — Hoang Tran
(74) *Attorney, Agent, or Firm* — Burns & Levinson LLP; Joseph M. Maraia (57) ABSTRACT

A system for determining properties of a radiant energy beam. The system include a plurality of fiber optic cables each including a first end and a second end and a plurality of optical coupling nodes coupled to a target body, wherein each optical coupling node includes one or more terminations, wherein each termination is coupled to the first end of one of the plurality of fiber optical cables to receive radiant energy from an incident radiant energy beam to determine properties of the radiant energy beam.

14 Claims, 7 Drawing Sheets

ENERGY TARGET SYSTEM

FIELD OF THE INVENTION

The currently described invention relates to systems and methods for determining properties of radiant energy beams.

BACKGROUND

Prior art methods for determining properties of radiant energy beams typically do not permit multiple properties of the beams to be measured at the same time and also are not able to be readily reconfigured for alternate applications. One prior art system employs a single type of detector that is embedded into a target board which limits the flexibility of using the system for multiple uses and for measuring more than one property of the radiant energy beams at the same time. Further, prior art systems use many individual, distributed detector elements which also limits the usefulness of the systems. A need therefore exists for improved systems and methods for determining properties of radiant energy beams.

SUMMARY

One embodiment is a system that includes a laser target board including multiple nodes arranged in a desired spatial pattern. Each node includes one or more fiber optic cable terminations. The fiber optic cables at each node feed one or more detectors (e.g., a high-speed photodiode) or instruments (e.g., an imaging spectrometer). The fiber optic cables from all nodes are bundled, routed, and spatially reformatted to accommodate the input of each detector/instrument (i.e., from the spatial node pattern of the target board to a square, rectangular, or line array at the detector/instrument). Incident laser illumination at the target board is received by the fiber optic cables and transmitted to the unique pixel elements of the respective detector or instrument for spectral, radiometric, polarimetric, and/or temporal analysis. The signals from all nodes are used to reconstruct the spatial distribution of the incident laser illumination. A real-time processor performs digital signal processing to analyze characteristics of the detector/instrument signals (e.g., center wavelength identification, absolute average power calculation, or spatial irradiance distribution uniformity). In some embodiments, a single, co-located detector array is used. This is a large advantage of the invention; in particular that electronics and functionality can be co-located.

One embodiment is a system for determining properties of a radiant energy beam. The system includes a plurality of fiber optic cables each including a first end and a second end. The system also includes a plurality of optical coupling nodes coupled to a target body, wherein each optical coupling node includes one or more terminations. Each termination is coupled to the first end of one of the plurality of fiber optical cables to receive radiant energy from an incident radiant energy beam to determine properties of the radiant energy beam.

In some embodiments, the system includes a plurality of detectors, wherein each detector is coupled to the second end of one of the fiber optic cables. In some embodiments, at least a subset of the optical coupling nodes each include a plurality of fiber optic terminations that each terminate an individual fiber optic cable. In some embodiments, at least a subset of the optical coupling nodes each include a plurality of fiber optic terminations positioned at different angles relative to each other to provide angle-of-arrival information of the radiant energy beam. In some embodiments, the system includes one or more filters coupled to the first or second end of a fiber optic cable or a termination of a coupling node to provide polarimetric information of the radiant energy beam.

In some embodiments, the plurality of fiber optic cables are bundled together in a predetermined configuration to mate with an array of detectors or optical instrument assembly arranged in the same predetermined configuration. In some embodiments, the plurality of fiber optic cables are bundled together in a linear array. In some embodiments, the system includes a slit mask located between the second end of the linear array of fiber optic cables and a shutter to controllably block the second end of the fiber optic cables.

Another embodiment is a method for determining properties of a radiant energy beam. The method includes coupling a plurality of optical coupling nodes coupled to a target body, wherein each optical coupling node includes one or more terminations. The method also includes coupling a first end of a fiber optic cable to one of the terminations of one of the optical coupling nodes to receive radiant energy from an incident radiant energy beam to determine properties of the radiant energy beam.

In some embodiments, the method includes coupling a second end of each fiber optic cable to a detector. In some embodiments, the method includes determining angle-of-arrival information of the radiant energy beam by positioning the fiber optic termination at individual optical coupling nodes at different angles relative to each other. In some embodiments, the method includes filtering the radiant energy transmitted by a fiber optic cable or optical coupling node to provide polarimetric information of the radiant energy beam.

In some embodiments, the method includes bundling the plurality of fiber optic cables in a predetermined configuration to mate with an array of detectors or optical instrument assembly arranged in the same predetermined configuration. In some embodiments, the method includes bundling the plurality of fiber optic cables into a linear array, and locating a slit mask between the second end of the linear array of fiber optic cables and a shutter to controllably block a second end of the fiber optic cables.

Other aspects and advantages of the current invention will become apparent from the following detailed description, taken in conjunction with the accompanying drawings, illustrating the principles of the invention by way of example only.

BRIEF DESCRIPTION OF THE DRAWINGS

The foregoing features of various embodiments of the invention will be more readily understood by reference to the following detailed descriptions in the accompanying drawings, in which.

DETAILED DESCRIPTION OF ILLUSTRATIVE EMBODIMENTS

Figure 1:
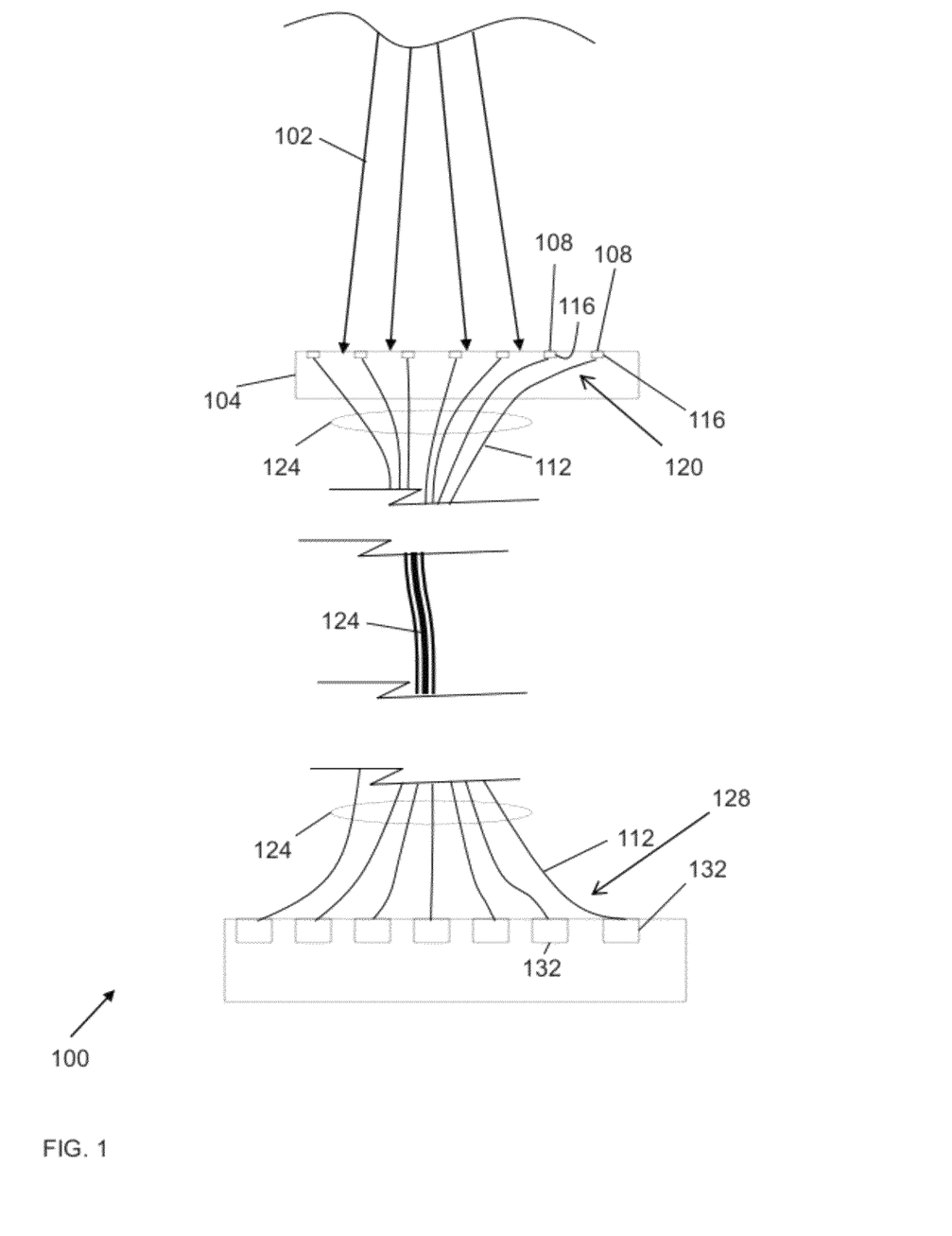
FIG. 1 is a schematic illustration of a system for determining properties of a radiant energy beam, according to one embodiment.

FIG. 1 is a schematic illustration of a system 100 for determining properties of a radiant energy beam 102, according to one embodiment. The system 100 includes a target body 104 and a plurality of optical coupling nodes 108 coupled to the target body 104. Each of the optical coupling nodes 108 includes one or more terminations. Each termination is coupled to a first end of a fiber optic cable to receive radiant energy from the incident radiant energy beam 102. In some embodiments, the optical coupling nodes are coupled to the target body 104 by being, for example, press fit, bonded, or screwed into a corresponding recess in the target body.

In this embodiment, the system 100 includes a plurality of fiber optic cables 112 (bundle 124). Each optical coupling node 108 of the target body 104 has a single termination 116. Each termination 116 is coupled to the first end 120 of one of the fiber optic cables 112 in the bundle 124. The system 100 also includes a plurality of detectors 132 and/or instruments. Each detector 132 is coupled to the second end of 128 of one of the fiber optic cables 112. Radiant energy received by the optical coupling nodes 108 is transmitted to the detectors 132 via the fiber optic cables 112.

Various types and quantities of detectors and/or instruments can be used in alternative embodiments to measure different properties of the incident radiant energy. Exemplary detectors include photodiodes (e.g., high speed photodiodes) used to measure relative irradiance and temporal signature of the radiant energy across the area covered by the optical coupling nodes 108. Additional detectors include, for example, calorimeters and thermocouples. Exemplary instruments include imaging spectrometers used to measure the center wavelength, spectrum and absolute irradiance of the incident radiant energy.

Figures 2A, 2B:
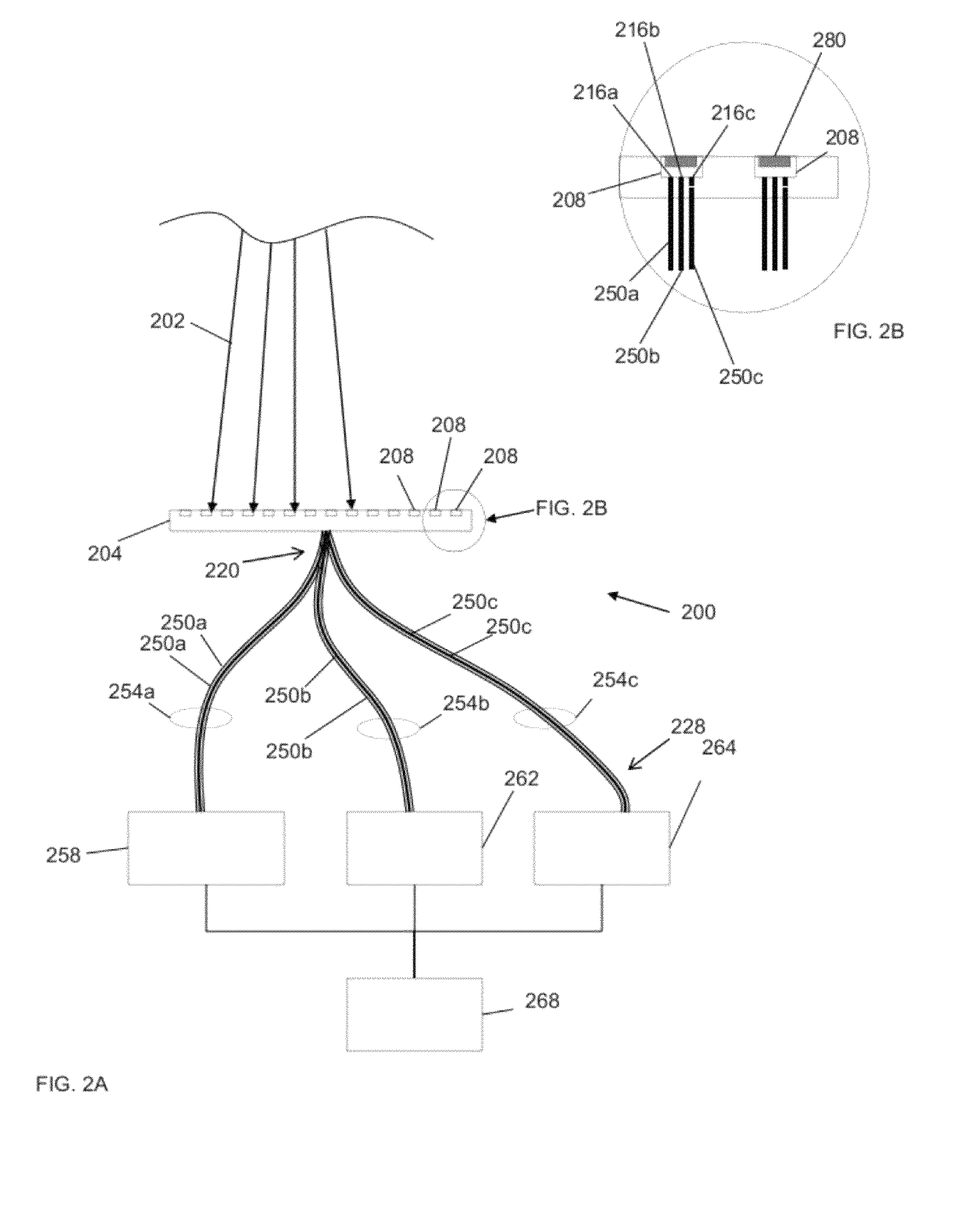
FIGS. 2A and 2B are a schematic illustration of a system for determining properties of a radiant energy beam, according to one embodiment.

FIGS. 2A and 2B are a schematic illustration of a system 200 for determining properties of a radiant energy beam 202, according to one embodiment. The system 200 includes a target body 204 and a plurality of optical coupling nodes 208 coupled to the target body 204. The system 200 includes a plurality of fiber optic cables 250. The fiber optic cables 250a, 250b, and 250c (generally 250) are arranged in three bundles 254a, 254b, and 254c (generally 254), respectively. Referring to FIG. 2B, each of the optical coupling nodes 208 includes three terminations 216a, 216b and 216 (generally 216). Each termination 216 is coupled to a first end 220 of a fiber optic cable 250 to receive radiant energy from the incident radiant energy beam 202 (e.g., termination 216a is coupled to the first end 220 of fiber optic cable 205a). In this manner, three different types of measurements can be acquired at each optical coupling node 208. In some embodiments, a subset of the optical coupling nodes 208 include a plurality of fiber optic terminations 216 that each terminate an individual fiber optic cable 250.

In this embodiment, the optical coupling nodes 208 of the system 200 include optional polarimetric filters 280 to sample polarimetric properties of the incident radiant energy at each optical coupling node 208 location. An operator my selectively change the type of filter used so the filter has, for example, a liner horizontal polarization, linear +45 degree polarization, circular polarization or no polarization. In some embodiments, multiple polarimetric filters are installed at each optical coupling node and a different fiber optic cable is coupled to each filter. In some embodiments, the filters are instead coupled to one of the ends of the fiber optic cables.

Each bundle 254 of fiber optic cables 250 is coupled to a different type of detector or instrument. In this embodiment, the second end 228 of the fiber optic cables 250 of bundle 254a are coupled to spectrometer 258, the second end 228 of the fiber optic cables 250 of bundle 254b are coupled to a plurality of photodiodes 262, and the second end 228 of the fiber optic cables 250 of bundle 254c are coupled to a plurality of calorimeters 264. Outputs of the spectrometer 258, photodiodes 262 and calorimeters 264 are coupled to a processor 268.

The processor 268 is configured to, for example, execute computer executable instructions or a computer program to perform functions of the invention by operating on data received from the spectrometer 258, photodiodes 262 and calorimeters 264 and by generating output. The processor 268 can, for example, collect data from the detectors and instruments and/or calibrate the detectors and instruments. The processor 268 can, for example, determine properties of the radiant energy beam 202 based on the radiant energy measured by the detectors 262 by each of the fiber optic cables 250a (bundle 254a) coupled to the optical coupling nodes 208 of the target body 204. Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data.

Figure 3A:
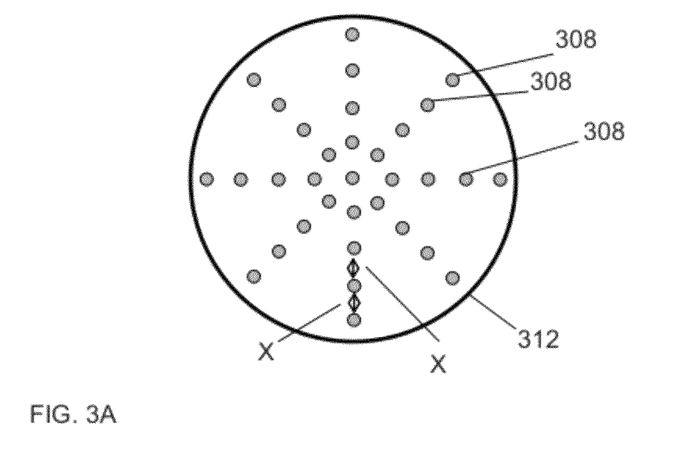
FIGS. 3A and 3B are schematic illustrations of exemplary configurations for optical coupling nodes of a target body.
Figure 3B:
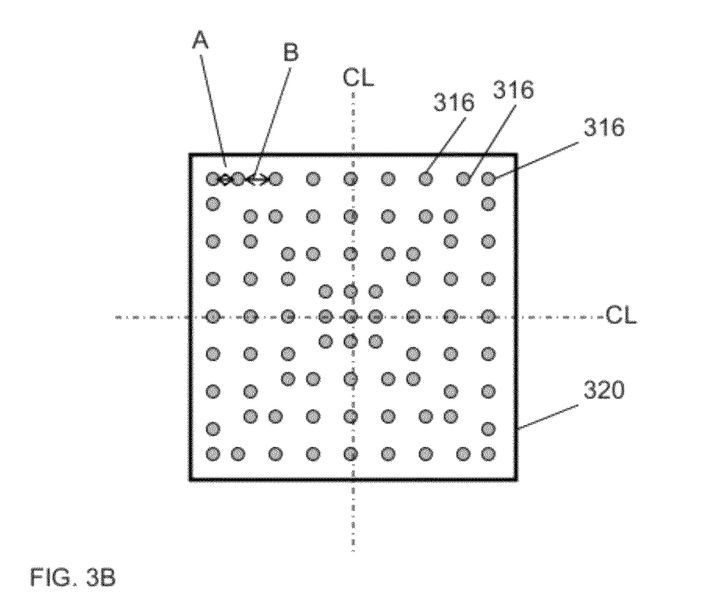

FIGS. 3A and 3B are schematic illustrations of exemplary configurations for optical coupling nodes of two different shaped target bodies. FIG. 3A depicts a plurality of optical coupling nodes 308 coupled to a circular target body 312. The optical coupling nodes 308 are arranged in a radially symmetric configuration with uniform spacing (X) between adjacent optical coupling nodes 308. FIG. 3B depicts a plurality of optical coupling nodes 316 coupled to a square target body 320. The optical coupling nodes 316 are arranged in a symmetric configuration relative to horizontal and vertical centerlines (CL). The optical coupling nodes 316 are arranged with variable spacing (X and Y) between adjacent optical coupling nodes 316.

Alternative configurations for the target body may be used in alternative embodiments. Alternative body shapes can be used in alternative embodiments. In some embodiments, the target body is a generally planar, board structure. In some embodiments, the target body has a three-dimensional shape is not a generally planar structure. In some embodiments, the optical coupling nodes are distributed along a contoured surface of the target body.

Figure 4:
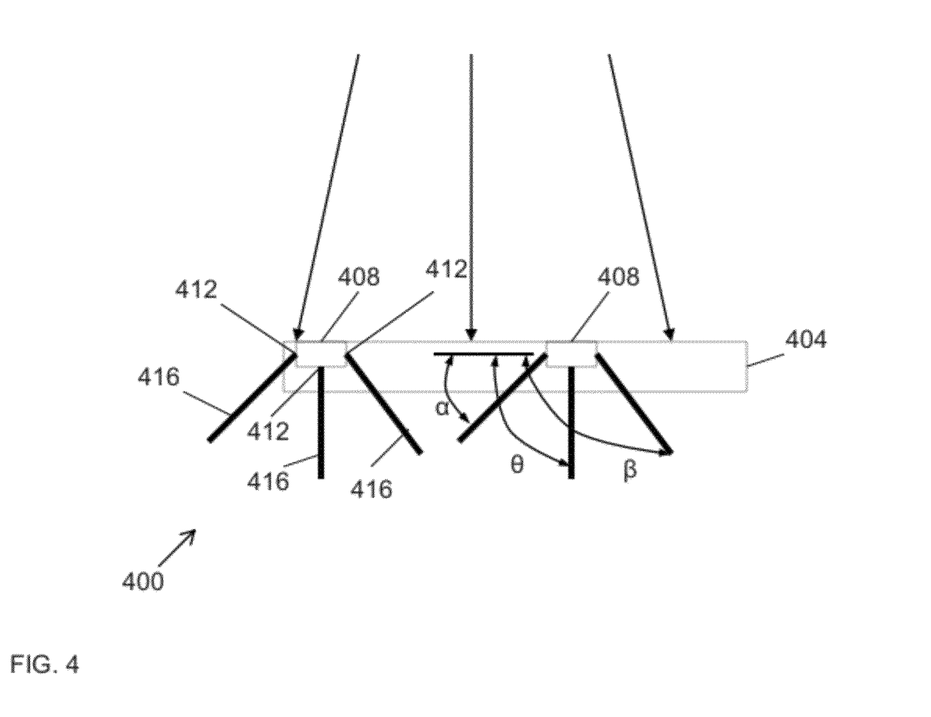
FIG. 4 is a schematic illustration of optical coupling nodes of a target body, according to one embodiment.

FIG. 4 is a schematic illustration of a portion of a system 400 for determining properties of a radiant energy beam, according to one embodiment. The system 400 includes a plurality of optical coupling nodes 408. Each optical coupling node 408 includes three terminations 412. The system 400 also includes a plurality of fiber optic cables 416. The fiber optic cables 416 of a single optical coupling node 408 are positioned at different angles ($\alpha$, $\theta$, $\beta$) relative to the optical coupling node 408 (or each other). In embodiments where the fiber optic cables 416 are coupled to detectors that measure the radiance of an incident radiant energy beam on the target body 404, the radiance measured by each fiber optic cable 412 coupled to a single optical coupling node may be used to provide a measure of the angle of incidence/angle-of-arrival of the incident radiant energy beam. The angles (α, θ, β) in FIG. 4 lie within a single plane (plane of the page); however, in other embodiments, the angular separation can be generalized to more additional or alternate dimensions. In another embodiment, optical coupling nodes 408 are positioned at different angles in both azimuth and elevation (in the plane of the page and a perpendicular plane into the page).

Figure 5A:
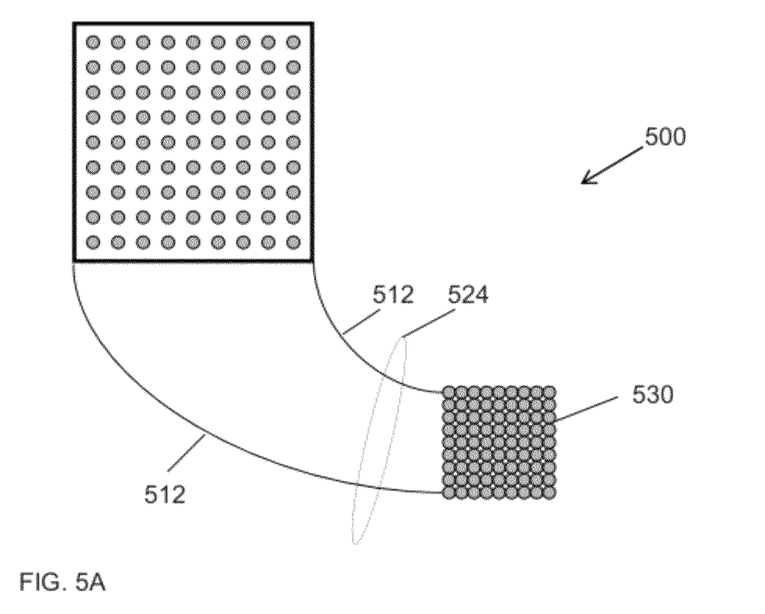
FIGS. 5A and 5B are schematic illustrations of fiber optic cables bundled together, according to two embodiments.
Figure 5B:
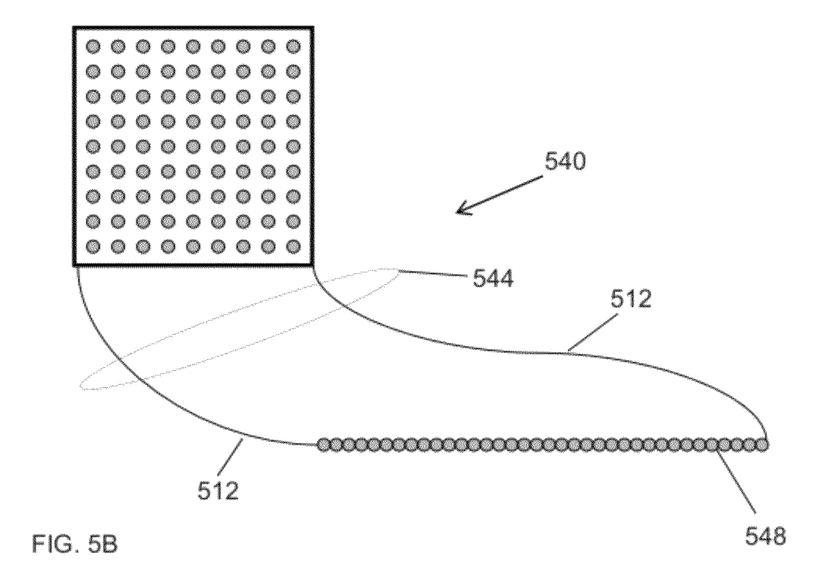

FIGS. 5A and 5B are schematic illustrations of fiber optic cables bundled together in predetermined configurations to mate with an array of detectors arranged in the same predetermined configurations, according to two embodiments. FIG. 5A is a schematic illustration of a system 500 having a fiber optic cable 512 bundle 524 in which the fiber optic cables 512 are bundled together in an area array 530 configuration (for example, in this embodiment, a square area array). FIG. 5B is a schematic illustration of a system 540 having a fiber optic cable 512 bundle 544 in which the fiber optic cables 512 are bundled together in a linear array 548 configuration. Alternative configurations may be created in alternative embodiments.

Figure 5C:
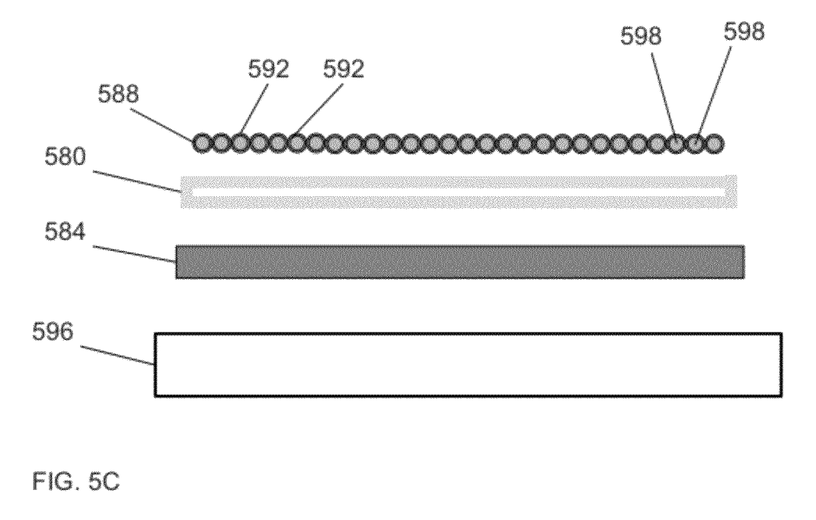
FIG. 5C is a schematic illustration of a slit mask and shutter for controllably blocking an end of an array of fiber optic cables, according to one embodiment.

FIG. 5C is a schematic illustration of a slit mask 580 and shutter 584 for controllably blocking the outputs 598 of an array 588 of fiber optic cables 592, according to one embodiment. The fiber optic cables 592 are coupled to set of detectors or instrument (spectrometer 596 is this embodiment). The slit mask 580 defines the area from each fiber optic cable 592 output 598 that illuminate the spectrometer 596. The shutter 584 is controlled by a processor (e.g., processor 268 of FIG. 2) to selectively block the output of the fiber optic cables 592 to, for example, provide dark level calibration conditions for the spectrometer 596.

Figure 6:
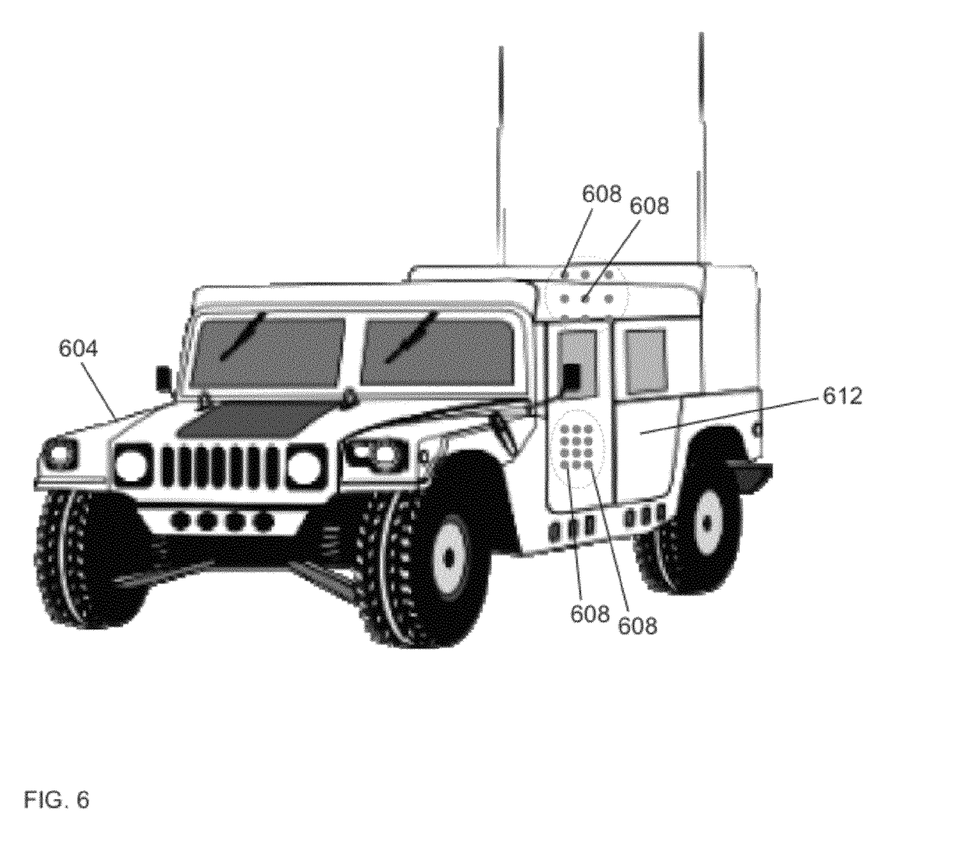
FIG. 6 is a schematic illustration of a system for determining properties of a radiant energy beam integrated with a target body that is a vehicle, according to one embodiment.

FIG. 6 is a schematic illustration of a system (e.g., system 100 of FIG. 1) for determining properties of incident radiant energy beams, according to one embodiment. The system is integrated into a vehicle target body 604. The vehicle 604 includes a plurality of optical coupling nodes 608 coupled to the body 612 of the vehicle 604. In some embodiments, the optical coupling nodes 608 are located at a variety of locations on the vehicle 604. The system 600 also includes a plurality of fiber optic cables (not shown) that are integrated into the body 612 of the vehicle 604. The first ends of the fiber optic cables are coupled to the optical coupling nodes 608, similarly as described herein. The second end of the fiber optic cables are coupled to one or more different types of detectors or instruments (located within the body 612 of the vehicle) to determine properties of radiant energy beams that are incident upon the body 612 of the vehicle 604.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A system for determining properties of radiant energy beam comprising: a plurality of fiber optic cables each including a first end and a second end; and a plurality of optical coupling nodes in contact to an outer surface of a target body, the target body being a vehicle, wherein a placement and a spacing between each of the plurality of optical coupling nodes is based on a shape of the target body and wherein each optical coupling node is coupled to the first end of a set of the plurality of fiber optical cables to receive radiant energy from an incident radiant energy beam to determine properties of the radiant energy beam, wherein each optical cable of the set of the plurality of fiber optical cable is positioned at different angles relative to a subject optical coupling node and wherein the different angles lie within a single plane.

2. The system of claim 1, comprising a plurality of detectors, wherein each detector is coupled to the second end of one of the fiber optic cables.

3. The system of claim 1, wherein at least a subset of the optical coupling nodes each include a plurality of fiber optic terminations that each terminate an individual fiber optic cable.

4. The system of claim 1, wherein at least a subset of the optical coupling nodes each include a plurality of fiber optic terminations positioned at different angles relative to each other to provide angle-of-arrival information of the radiant energy beam.

5. The system of claim 1, comprising one or more filters coupled to the first or second end of a fiber optic cable or a termination of a coupling node to provide polarimetric information of the radiant energy beam.

6. The system of claim 1, wherein the plurality of fiber optic cables are bundled together in a predetermined configuration to mate with an array of detectors or optical instrument assembly arranged in the same predetermined configuration.

7. The system of claim 6, wherein the plurality of fiber optic cables are bundled together in a linear array.

8. The system of claim 7, comprising a slit mask located between the second end of the linear array of fiber optic cables and a shutter to controllably block the second end of the fiber optic cables.

9. A method for determining properties of radiant energy beam comprising: coupling a plurality of optical coupling nodes in contact to an outer surface of a target body, the target body being a vehicle, wherein a placement and a spacing between each of the plurality of optical coupling nodes is based on a shape of the target body; coupling a set of fiber optic cables to a subject optical coupling node to receive radiant energy from an incident radiant energy beam to determine properties of the radiant energy beam; and positioning each fiber optical cable of the set of fiber optic cables at different angles relative to the subject optical coupling node and wherein the different angles lie within a single plane.

10. The method of claim 9, comprising coupling a second end of each fiber optic cable to a detector.

11. The method of claim 9, comprising determining angle-of-arrival information of the radiant energy beam by positioning the fiber optic termination at individual optical coupling nodes at different angles relative to each other.

12. The method of claim 9, comprising filtering the radiant energy transmitted by a fiber optic cable or optical coupling node to provide polarimetric information of the radiant energy beam.

13. The method of claim 9, comprising bundling the plurality of fiber optic cables in a predetermined configuration to mate with an array of detectors or optical instrument assembly arranged in the same predetermined configuration.

14. The method of claim 9, comprising bundling the plurality of fiber optic cables into a linear array, and locating a slit mask between the second end of the linear array of fiber optic cables and a shutter to controllably block a second end of the fiber optic cables.

\* \* \* \* \*